United States Patent
Barrus et al.

(10) Patent No.: US 10,114,536 B2
(45) Date of Patent: Oct. 30, 2018

(54) SYSTEMS AND METHODS FOR PERFORMING ACTIONS FOR USERS FROM A LOCKED DEVICE

(71) Applicant: Microsoft Corporation, Redmond, WA (US)

(72) Inventors: Adam Barrus, Bellevue, WA (US); Eugene Lin, Seattle, WA (US); Alice Steinglass, Bellevue, WA (US); Jessica Murray, Seattle, WA (US); Mao Yu, Woodinville, WA (US); Katrina Koo, Seattle, WA (US); Ginger Gloystein, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 13/853,353

(22) Filed: Mar. 29, 2013

(65) Prior Publication Data
US 2014/0298190 A1    Oct. 2, 2014

(51) Int. Cl.
*G06F 3/0485*    (2013.01)
*G06F 3/0488*    (2013.01)
(Continued)

(52) U.S. Cl.
CPC ........ *G06F 3/0485* (2013.01); *G06F 3/04883* (2013.01); *G06F 3/04886* (2013.01);
(Continued)

(58) Field of Classification Search
CPC .... G06F 3/0488; G06F 21/31; G06F 3/04842; G06F 3/0481; G06F 3/0482;
(Continued)

(56) References Cited

U.S. PATENT DOCUMENTS 7,617,530 B2 * 11/2009 Ruzyski .............. G06F 21/6218
                                                      713/182
7,657,849 B2 *  2/2010 Chaudhri ............ G06F 3/04883
                                                      345/173
(Continued)

FOREIGN PATENT DOCUMENTS

CN    102402661 A    4/2012
CN    102449916 A    5/2012
(Continued)

OTHER PUBLICATIONS

"International Search Report & Written Opinion for PCT Patent Application No. PCT/US2013/060490", dated Dec. 17, 2013, Filed Date: Sep. 19, 2013, 12 Pages.
(Continued)

*Primary Examiner* — Renee D Chavez
*Assistant Examiner* — Carl P Lobo
(74) *Attorney, Agent, or Firm* — Rainier Patents, P.S.

(57) ABSTRACT

Systems and methods for providing actions for users of a computer device from a lock screen interface are provided. A computing device may comprise a touch-sensitive display screen that may allow a user to scroll through a set of user interfaces that may comprise a set of lock screen interfaces—one of which may be associated with the user, if authorized for using the computing device. The computing device may allow the user to scroll to one of the following: a set of locked screen interfaces, a set of sign-in interfaces, a set of applications allowed for use (e.g., a camera) by the computer device (even if the user is not signed-in) and a new mode of functionality for computing device (e.g., a children's entertainment application). The computer system may allow swiping from multiple discernible directions to allow the scrolling through user interfaces in a natural manner.

20 Claims, 5 Drawing Sheets

(51) Int. Cl.
  H04M 1/725    (2006.01)
  G06F 21/31    (2013.01)
  H04M 1/67     (2006.01)
(52) U.S. Cl.
  CPC ........ *G06F 21/31* (2013.01); *H04M 1/72577* (2013.01); *H04M 1/67* (2013.01)
(58) Field of Classification Search
  CPC .... G06F 3/04817; G06F 21/554; G06F 21/36; G06F 2221/2147; G06F 3/0416; G06F 9/4451; G06F 3/0485; G06F 3/0484; G06F 2221/2141; G06F 21/44; G06F 2221/2149; G06Q 10/00; H04W 12/06; H04W 4/206; H04L 67/02; H04L 63/08; H04L 67/306; H04M 1/72569
  See application file for complete search history.

(56) References Cited

U.S. PATENT DOCUMENTS

| | | | | |
|---|---|---|---|---|
| 8,136,053 | B1* | 3/2012 | Miller | G06F 3/04883 345/156 |
| 8,341,557 | B2* | 12/2012 | Pisula | G06F 3/04886 345/169 |
| 8,776,095 | B2* | 7/2014 | Huang | G06F 21/6209 715/741 |
| 9,213,822 | B2* | 12/2015 | Dellinger | G06F 3/0488 |
| 9,367,672 | B2* | 6/2016 | Eggerton | G06F 21/31 |
| 9,423,952 | B2* | 8/2016 | Tamegai | G06F 3/0412 |
| 9,880,717 | B1* | 1/2018 | Persson | G06F 3/04883 |
| 2002/0038333 | A1* | 3/2002 | Evans | G06F 9/4443 718/107 |
| 2003/0227487 | A1* | 12/2003 | Hugh | G06F 17/30958 715/777 |
| 2005/0066202 | A1* | 3/2005 | Evans | G06F 9/4443 726/19 |
| 2005/0107114 | A1* | 5/2005 | Ocock | H04W 8/183 455/550.1 |
| 2005/0188313 | A1* | 8/2005 | Matthews | G06F 9/4443 715/741 |
| 2007/0204016 | A1* | 8/2007 | Kunz | G06Q 10/06 709/223 |
| 2008/0036743 | A1* | 2/2008 | Westerman | G06F 3/038 345/173 |
| 2008/0126978 | A1* | 5/2008 | Bai | G06F 21/53 715/778 |
| 2008/0168403 | A1* | 7/2008 | Westerman | G06F 3/04883 715/863 |
| 2008/0177821 | A1* | 7/2008 | Tsao | G06F 9/526 709/201 |
| 2009/0259968 | A1 | 10/2009 | Hsieh | |
| 2009/0282473 | A1* | 11/2009 | Karlson | H04L 63/102 726/17 |
| 2010/0223558 | A1* | 9/2010 | Feng | 715/741 |
| 2010/0231537 | A1* | 9/2010 | Pisula | G06F 3/0481 345/173 |
| 2010/0235794 | A1* | 9/2010 | Ording | G06F 3/0485 715/863 |
| 2010/0306718 | A1* | 12/2010 | Shim | G06F 3/04883 715/863 |
| 2012/0009896 | A1* | 1/2012 | Bandyopadhyay et al. | 455/411 |
| 2012/0023573 | A1* | 1/2012 | Shi | G06F 3/04883 726/17 |
| 2012/0032945 | A1* | 2/2012 | Dare | G06F 3/0481 345/418 |
| 2012/0036552 | A1* | 2/2012 | Dare et al. | 726/1 |
| 2012/0084734 | A1* | 4/2012 | Wilairat | G06F 21/36 715/863 |
| 2012/0154301 | A1* | 6/2012 | Kang | G06F 3/04886 345/173 |
| 2012/0166998 | A1* | 6/2012 | Cotterill et al. | 715/780 |
| 2012/0223959 | A1* | 9/2012 | Lengeling | G06F 3/04883 345/619 |
| 2012/0259707 | A1* | 10/2012 | Thielke | G06Q 30/0267 705/14.64 |
| 2012/0284297 | A1* | 11/2012 | Aguera-Arcas | G06F 3/03547 707/769 |
| 2012/0284673 | A1* | 11/2012 | Lamb | G06F 3/04883 715/863 |
| 2012/0284789 | A1* | 11/2012 | Kim | G06F 1/1694 726/19 |
| 2012/0331548 | A1* | 12/2012 | Tseng | G06F 21/31 726/19 |
| 2013/0035141 | A1* | 2/2013 | Murakami | G06F 3/0488 455/566 |
| 2013/0069893 | A1* | 3/2013 | Brinda | G06F 3/0488 345/173 |
| 2013/0203397 | A1* | 8/2013 | Vidal | H04W 12/06 455/418 |
| 2013/0305354 | A1* | 11/2013 | King | G06F 21/31 726/19 |
| 2013/0332885 | A1* | 12/2013 | Ji | G06F 3/04847 715/833 |
| 2014/0189596 | A1* | 7/2014 | Taniuchi | G06F 3/0482 715/835 |
| 2014/0223542 | A1* | 8/2014 | Hicks | G06F 21/45 726/16 |
| 2014/0237378 | A1* | 8/2014 | Gonen | H04M 1/72519 715/745 |
| 2015/0074798 | A1* | 3/2015 | Liu | G06F 3/0488 726/19 |
| 2016/0196419 | A1* | 7/2016 | Kuscher | G06F 21/36 715/741 |
| 2016/0371872 | A1* | 12/2016 | Bao | G06T 13/80 |
| 2017/0139584 | A1* | 5/2017 | Santhiveeran | G06F 3/0481 |

FOREIGN PATENT DOCUMENTS

| | | |
|---|---|---|
| CN | 102830920 A | 12/2012 |
| CN | 102917348 A | 2/2013 |
| EP | 2424200 A2 | 2/2012 |
| WO | 2012/088474 A2 | 6/2012 |

OTHER PUBLICATIONS

Florence Ion et al: "Hands-on: Multiple users, lock screen widgets round out Android 4.2 I Ars Technica", Arstechnica, Nov. 14, 2812 (Nov. 14, 2812), XP855892155, Retrieved from the Internet:.
Android 4.2 Feature Highlight: Multiple User Accounts—Published Date: Nov. 14, 2012 Proceedings: NA Author: Cameron Summerson pp. 5 http://www.androidpolice.com/2012/11/14/android-4-2-feature-highlight-multiple-user-accounts/.
Personalise Your Phone—Retrieved Date: Feb. 27, 2013 Proceedings: NA Author: NA pp. 2 http://www.nokia.com/in-en/support/product/lumia820/userguide/?.
Hands-on: Multiple Users, Lock Screen Widgets Round Out Android 4.2—Published Date: Nov. 14, 2012 Proceedings: NA Author: Florence Ion and Andrew Cunningham pp. 7 http://arstechnica.com/gadgets/2012/11/hands-on-multiple-users-lock-screen-widgets-round-out-android-4-2/.
What is the Windows 8 lock screen?—Retrieved Date: Feb. 27, 2013 Proceedings: NA Author: NA pp. 4 http://www.soluto.com/kb/windows-8/what-is-the-windows-8-lock-screen/.
Communication pursuant to Rules 161(1) and 162 EPC dated Nov. 6, 2015 from European Patent Application No. 13771291.5, 2 pages.
Response dated May 17, 2016 to the Communication pursuant to Rules 161(1) and 162 EPC dated Nov. 6, 2015 from European Patent Application No. 13771291.5, 14 pages.
International Preliminary Report on Patentability dated Oct. 8, 2015 from PCT Patent Application No. PCT/US2013/060490, 2 pages.
First Office Action dated Mar. 30, 2017 from Chinese Patent Application No. 201380075253.6, 11 pages.
Response filed Aug. 14, 2017 to the First Office Action dated Mar. 30, 2017 from Chinese Patent Application No. 201380075259.6, 11 pages.

(56) References Cited

OTHER PUBLICATIONS

"Second Office Action Issued in Chinese Patent Application No. 201380075259.6", dated Nov. 27, 2017, 9 Pages. (W/o English Translation).
"Third Office Action Issued in Chinese Patent Application No. 201380075259.6", dated Jun. 4, 2018, 11 pages.

* cited by examiner

SYSTEMS AND METHODS FOR PERFORMING ACTIONS FOR USERS FROM A LOCKED DEVICE

BACKGROUND

In many operating systems (e.g., Windows® Operating System), the concept of a "lock screen" provides safety and confidence for users of a computing device or platform. In some cases, such an operating system may be a multi-user environment—allowing multiple users to access/share such a computing device. In addition, a user's lock screen may be personalized and specific to each user on the computer device (e.g., computer, laptop, tablet, smart phone or the like).

In addition, when the device is in lock screen mode, it may not be possible to use features of the device unless and/or until at least one of the users have signed in (or otherwise, logged in) to the device.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and methods for providing actions for users of a computer device from a lock screen interface are provided. A computing device may comprise a touch-sensitive display screen that may allow a user to scroll through a set of user interfaces that may comprise a set of lock screen interfaces—one of which may be associated with the user, if authorized for using the computing device. The computing device may allow the user to scroll to one of the following: a set of locked screen interfaces, a set of sign-in interfaces, a set of applications allowed for use (e.g., a camera) by the computer device (even if the user is not signed-in) and a new mode of functionality for computing device (e.g., a children's entertainment application). The computer system may allow swiping from multiple discernible directions to allow the scrolling through user interfaces in a natural manner.

In one embodiment, a method for performing actions for users with a computing device in a locked state is presented, the method comprising: presenting a first user interface to a user of a computing device, said first user interface being a first lock screen interface; allowing user to scroll from said first user interface to a second user interface; and wherein said second user interface being one of a group, said group comprising: a second lock screen, a set of applications allowed to be accessed by said user from said first lock screen and a new mode of functionality for said computing device.

In another embodiment, a computing device is presented comprising: a controller; a touch-sensitive display; an operating system, said operating system capable of executing on said controller and said controlling said computing device; wherein said operating system is capable of managing a set of authorized users for said computing device and presenting associated user interfaces to users of said computing device; further wherein said operating system is capable of: presenting a first user interface to a user of a computing device, said first user interface being a first lock screen interface; allowing user to scroll from said first user interface to a second user interface; and wherein said second user interface being one of a group, said group comprising: a second lock screen, a set of applications allowed to be accessed by said user from said first lock screen and a new mode of functionality for said computing device.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

While a device is in lock screen mode, it may be desirable to allow the use of some functionality and/or features of the device—even while the device is in such a mode. In many embodiment, various features and/or functionality may be made available and/or their usage from a device in a lock screen mode (e.g., possibly in a multi-user environment) may be made smoother. In many such embodiments, users may be allowed to directly scroll through or otherwise manipulate the lock screen surface—e.g., to switch the user that will sign in, or activate certain functions or features of the device (e.g., the camera or the like).

For merely one example, direct manipulation of a device in lock screen mode might allow the user to switch the locked device into a distinctly different mode (for example, as for children's entertainment application, like a "Kid's Corner") while still in a locked state.

Figure 1:
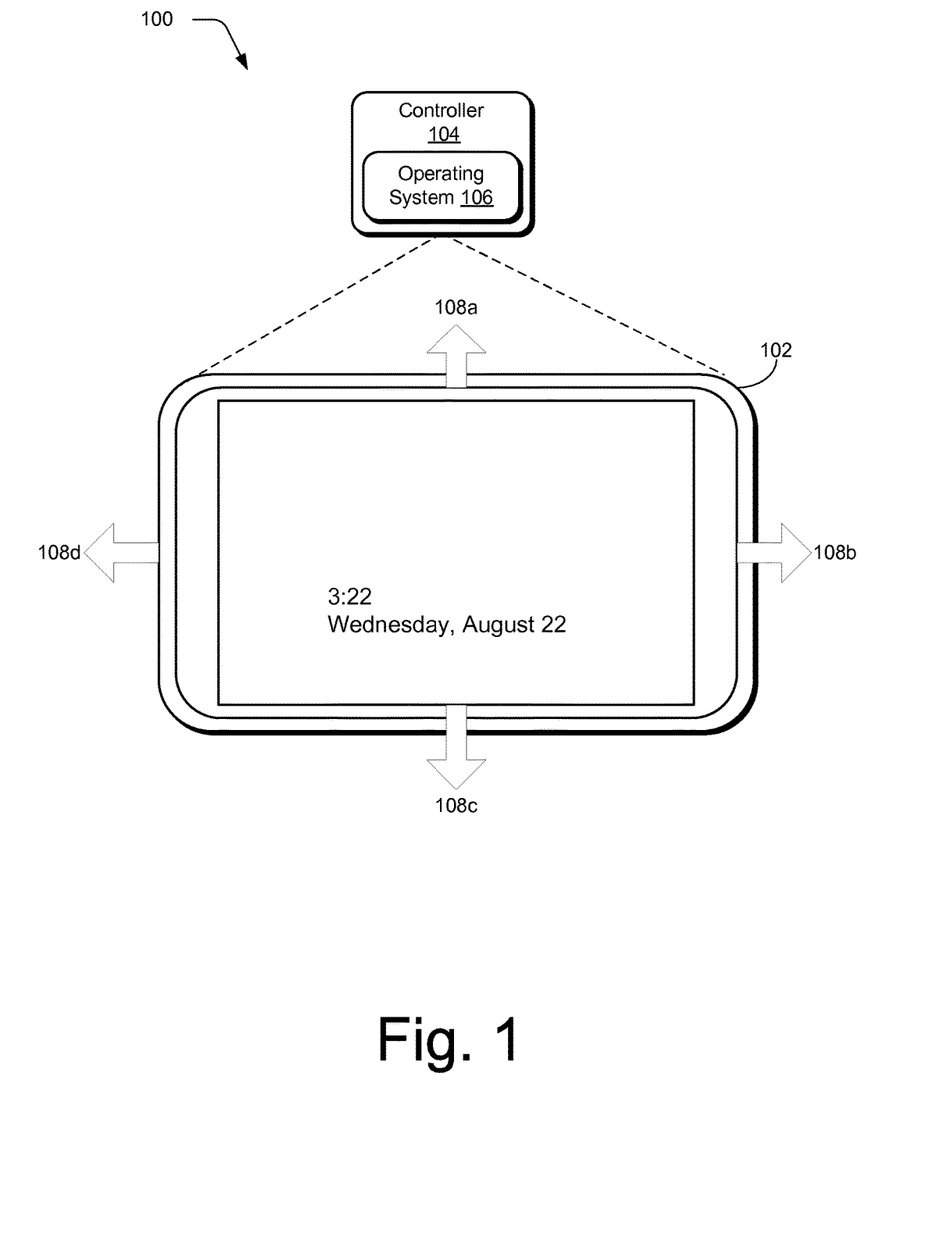
FIG. 1 depicts one embodiment of a computer device/system in made in accordance with the principles of the present application

FIG. 1 is one embodiment 100 of an exemplary device 102 as may be employed in association with systems and/or methods of the present application. Device 102 may further comprise a controller 104 that may be executing an operating system 106. In one embodiment, device 102 may also comprise a touch screen—in which various touch and/or swiping gestures (e.g., in a number of directions as shown, vertical and/or horizontal directions 108) may invoke various actions by the operating system in response thereto.

In FIG. 1, device 102 is depicted in a lock screen mode (e.g., showing local time, or any other desired information thereon). From a lock screen mode, it may be possible that device 102 may have different mechanisms to place the device into different modes, allow a desired set of applications, or allow access to different users in a multi-user environment. For example, for a touch screen enabled device like 102, swiping gestures 108 (e.g. from vertical and/or horizontal directions) may produce desired actions from a lock screen mode.

It should be appreciated that, while FIG. 1 depicts a touch screen enabled computing device (e.g., Apple iPad® tablet or Microsoft Surface™ tablet), the systems, methods and principles of the present application may also find application in other devices and/or platforms—e.g., personal computers, laptops, smart devices or the like. Touch screen gestures or commands may possibly be substituted by suitable other I/O commands (e.g., touch pad, mouse, keyboard strokes, voice commands) or the like. Thus, where the application discusses touch gestures (such as swipes or the like), it may be possible to duplicate such gesture with another I/O command for a suitable computing device (e.g., that may not be touch-enabled).

Various Action Embodiments

In one embodiment, a lock screen may be directly manipulated in (e.g., a touch device) by various gestures and swipes. For example, a swipe in both a first direction may: (1) switch potential users that may sign in when it is swiped; (2) allow a current user to activate some feature and/or functionality (e.g., the camera) when it is swiped; or (3) enable another mode of functionality for the device. For one example, such utility may be desirable in order to allow the current user (whether an authorized user or otherwise) to capture a photo or video for a particular user in a multi-user environment prior to sign in. In another embodiment, swiping gestures (e.g., at the end of a horizontally panning list) may allow the user to switch the device into a distinct new mode, such as a children's entertainment application ("Kid's Corner" or the like). The following is a list of potentially desirable actions:

(i) User Switching from a Locked Device

Figure 2:
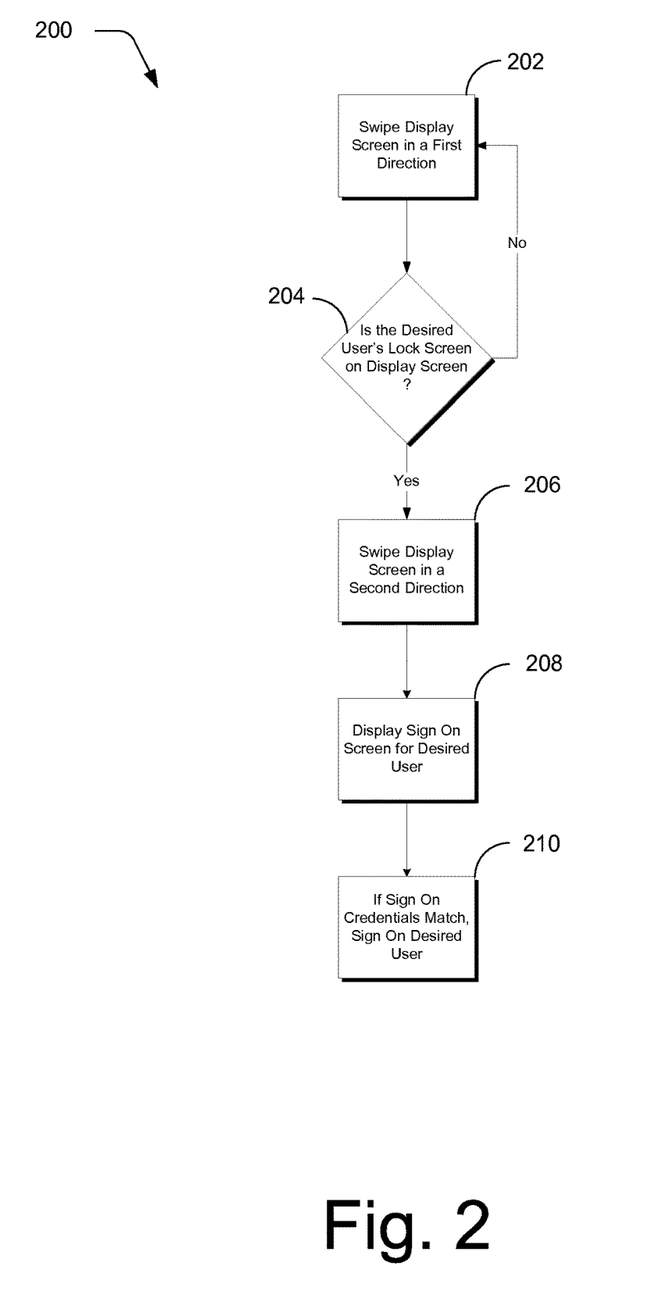
FIG. 2 shows one embodiment of a method of traversing a multi-user environment to allow different users to sign into a device similar to that shown in FIG. 1.

When a device is locked, the lock screen for the user that was last active on the device may be shown. If another user wants to sign in to the device, the user may simply swipe e.g., to the left or to the right (or any other suitable direction) to find the user's own personalized lock screen. From there, the user may then swipe (possibly in a second direction) to sign in. FIG. 2 shows one embodiment of a flowchart (200) that allows a device and/or its operating system to switch access to the device by multiple users of such a device. At 202, a device in a lock screen mode for a first user may receive a swipe (or other gesture) in a first direction to switch user lock screens (e.g., to a second, authorized user). If the current user's lock screen is not displayed on the screen, then the device may continue to receive swipes/gestures to toggle between different user lock screens (back at 202).

If the current user's lock screen is displayed on the device, then the device may receive another swipe/gesture at 206 to produce the current user's sign on screen at 208. At this point, the current user may enter his/her sign on credentials (e.g., a password, other swipe gestures or the like) at 210—thereby allowing the current user to access the device (e.g., as at a Start screen or the like).

(ii) Multi-User Camera from a Locked Device

Figure 3:
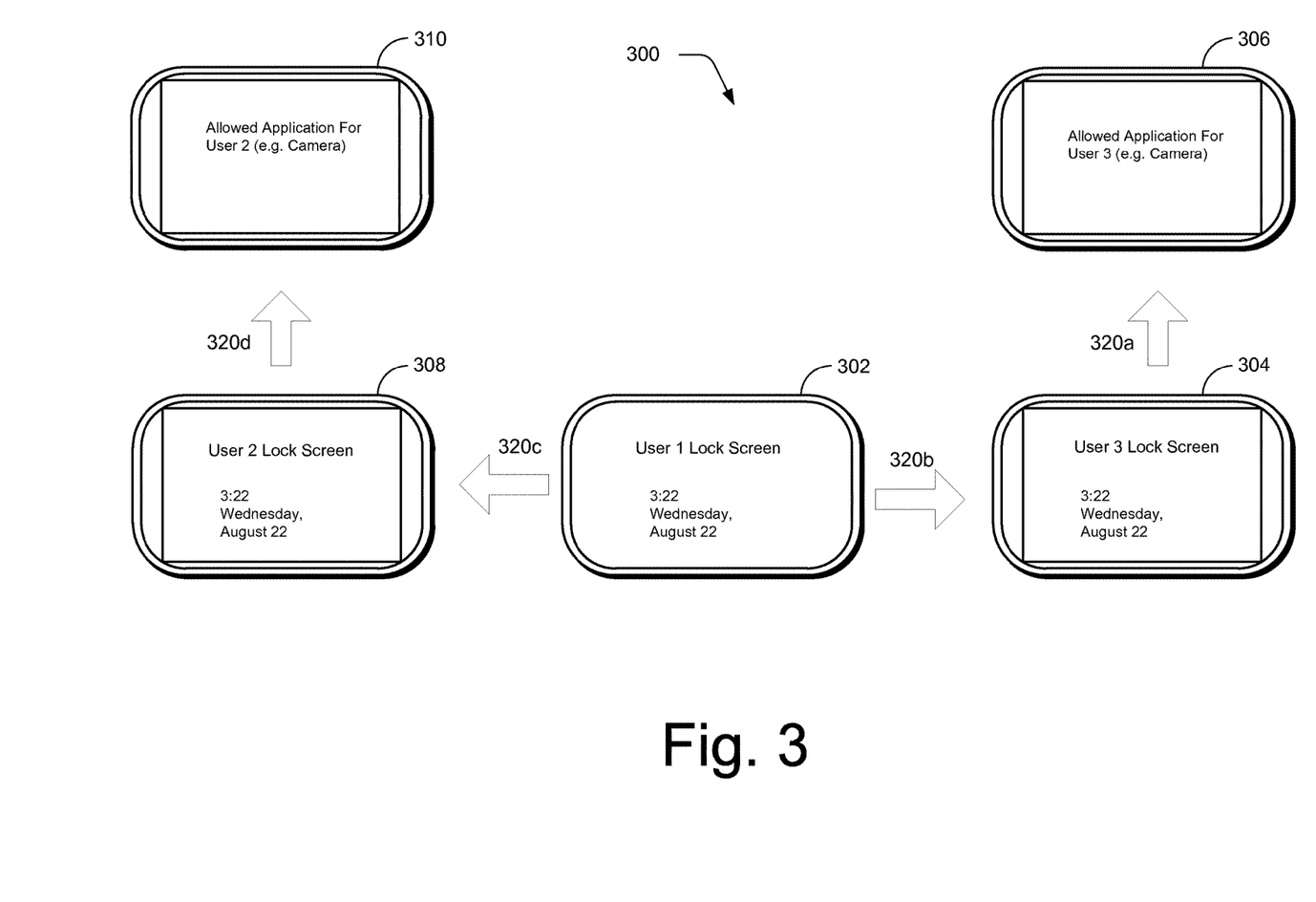
FIG. 3 shows one embodiment of a flowchart for allowing multiple users of a device from lock screen mode to access a set of allowed applications from their corresponding lock screens.

In another embodiment, while a device is locked, a current user may be able to activate one of a set of allowed applications (e.g., using the camera) from the lock screen. One paradigm example would be to capture a photo or video without first signing in. FIG. 3 is one embodiment of a flowchart (300) of allowing potentially multiple users of a device to access a set of allowed application while still in a lock screen mode. Device 302 may exhibit User 1's lock screen. If the current user desiring to use the device is not User 1, then a swipe (320c or 320b) may toggle the lock screen of the current user to the fore (e.g., at 304 or 308). One the current user's lock screen is exhibited, then a swipe (e.g., 320a or 320d) in e.g., potentially a second direction may exhibit a set of allowed applications to be selected from by the current user (e.g., at 306 or 310).

In one paradigm example, a user may swipe down on the lock screen and the camera is activated for that user. Photos and videos that are captured will be placed into that user's "camera roll" folder. If a different user wanted to take photos or videos and have that media saved to her camera roll folder, the user may swipe from left to right on the lock screen to find her own personalized lock screen, then swipe up to activate the camera for the user and save the media to the user's own camera roll.

It may be appreciated that the set of allowed application for a given user may be different for different users of the device. This may be set by the administrator and/or owner of the device, as desired.

(iii) Activating a New Mode from a Locked Device

Figure 4:
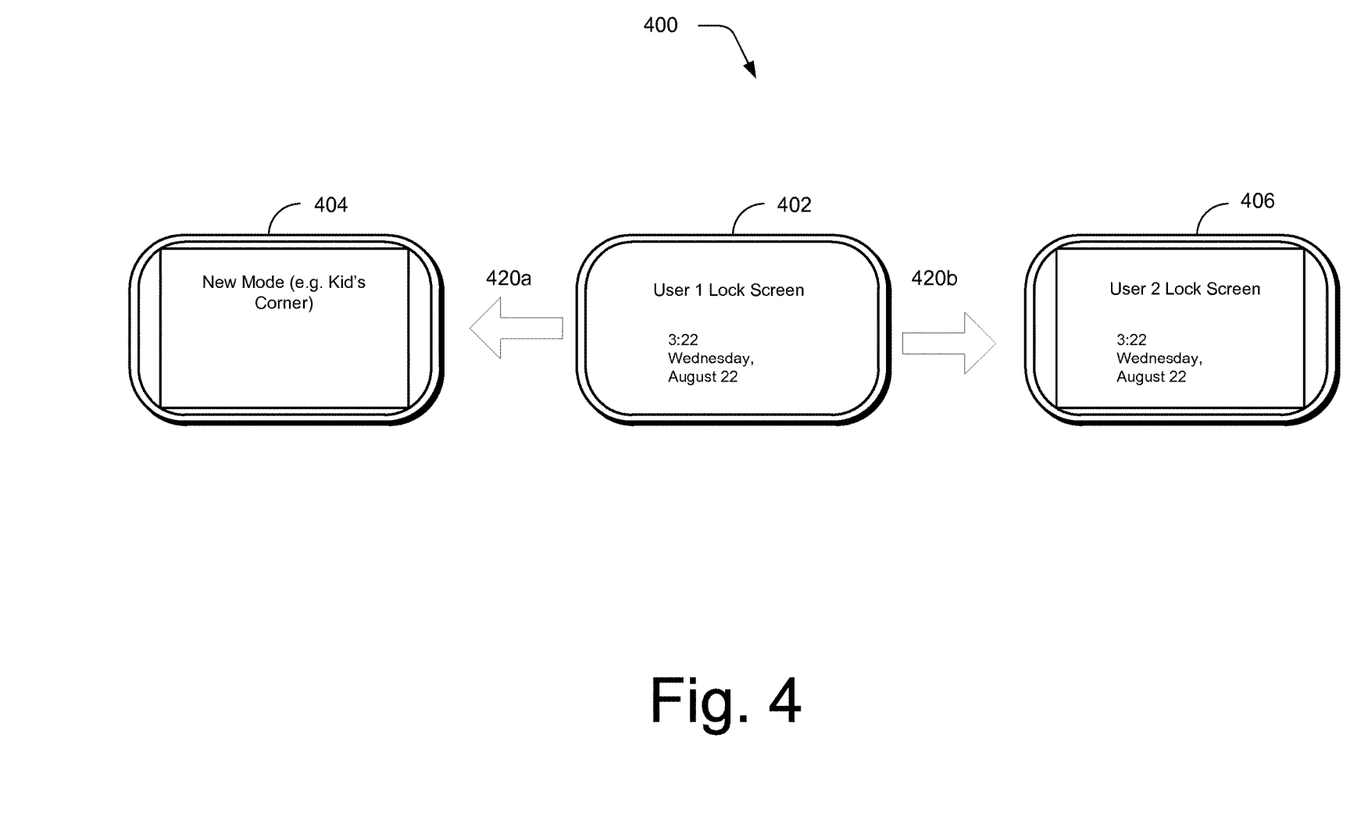
FIG. 4 shows one embodiment of a flowchart for allowing multiple users of a device to access their associated lock screens.

In another embodiment, while the device is locked, a user may be able to swipe to switch between various users' lock screens. In one embodiment, at the end of that list, a new mode may be presented to the user—into which the user may swipe into a screen that activates a new, distinct mode on the locked device, such as Kid's Corner, a demonstration mode, etc. FIG. 4 shows one embodiment of a flowchart (400) that allows a current user to switch user's lock screen or choose an alternative functional mode. Device 402 may present User 1's lock screen. If this is not the desired current user, then the current user may swipe and/or gesture (420b) to present other user (e.g., User 2) lock screen. This swipe may be continued (e.g., in a first direction) until the current user's lock screen is presented or all of the authorized user's lock screens have been presented (at 406). At this point, the current user may swipe (420a) to produce a new mode of functionality for the device (e.g., a children's entertainment mode—"Kid's Corner" or the like). The swipe/gesture 420a may be in a new, second direction—or continue in the first direction, after the list of authorized user's lock screens have been exhausted.

(iv) Distinct Behavior Accessible Via Directional Swipe from a Locked Device

In another embodiment, while the device is locked, it may be possible to allow a user to swipe in a number of distinct directions to access different behavior. For merely exemplary purposes, a user may engage in: (1) swiping up to unlock the device; (2) swiping down to access one of a set of allowed applications (e.g., the camera) for the user whose lock screen is shown; and/or (3) swiping left or right to switch between various users' lock screens, or goes into a new mode, like Kid's Corner.

Figure 5:
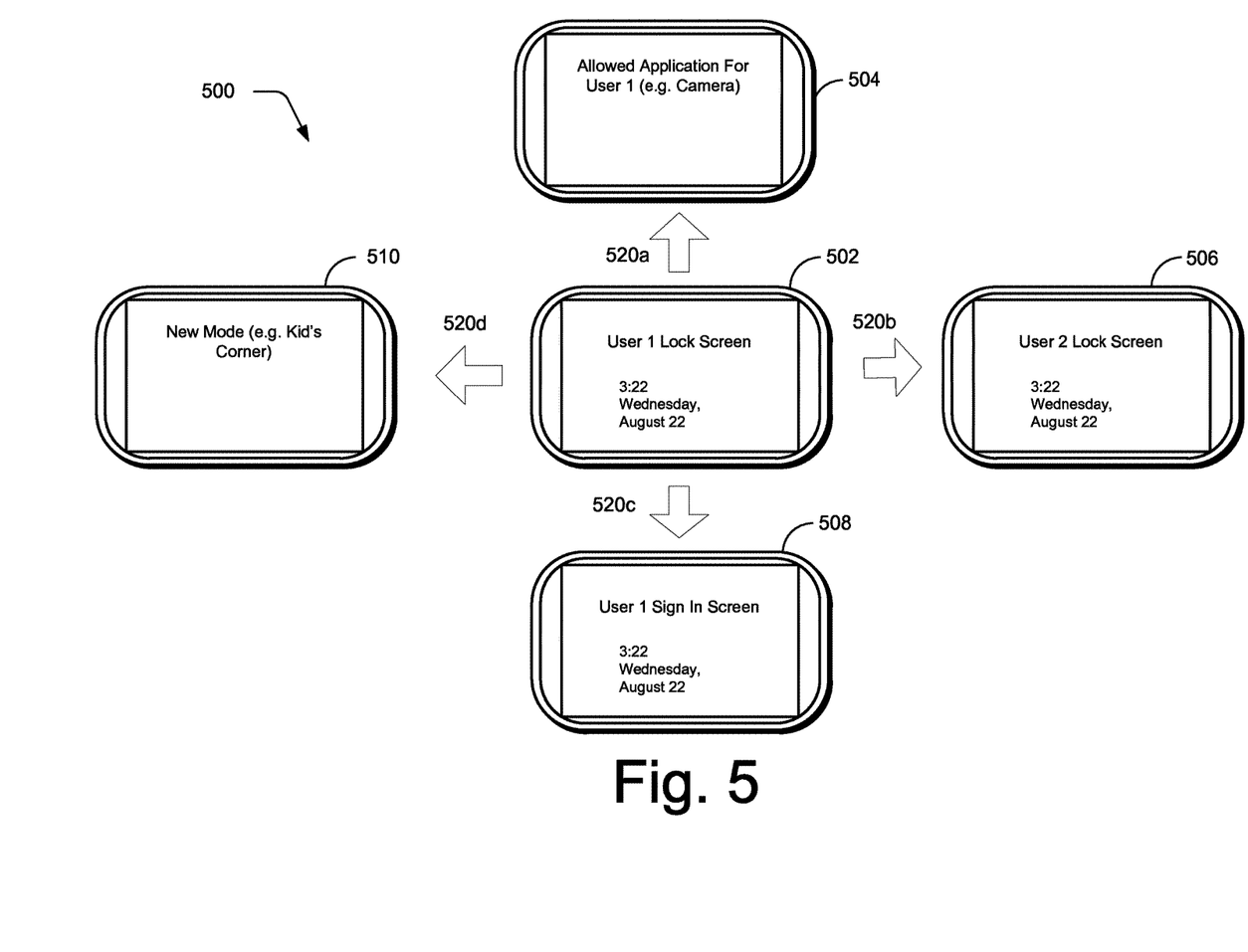
FIG. 5 shows one embodiment of a flowchart for allowing a user of a device to move from a user's lock screen to a set of other allowed applications, modes and other user's lock screens.

FIG. 5 shows one embodiment of a flowchart (500) of such a process. Device 502 may present User 1's lock screen. If this is the current user, then User 1 may swipe/gesture (520c) to access a sign-on screen. Alternatively, User 1 may swipe/gesture (520a) to access a set of allowed applications from the lock screen (e.g., the camera) at 504. In another embodiment, User 1 may swipe/gesture (520d) to place the device into another mode of functionality at 510.

If this is not the current user, then the current user may swipe/gesture (at 520b) to access other users' lock screens (506). Once the desired lock screen is presented by the device, then the current user may continue swiping/gesturing—as in 520a through 520d, and continue as desired.

Alternative Embodiments

In other embodiments, a user may swipe left or right, directly on the lock screen, to switch between various users' lock screens. Once on a particular lock screen, the user can swipe up to sign in for that user, or swipe down to activate the camera for that user. A user may swipe from a user's lock screen to a mode, such as Kid's Corner. This "mode" would likely be on the end of the list of users' lock screens. It could be on the far left end of the list or the far right end of the list. A user may activate the camera from a locked device for a particular user, after landing on that user's lock screen.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A computing device comprising:
a controller;
a touch-sensitive display; and
an operating system configured to execute on the controller;
the operating system being further configured to:
provide a plurality of different user-specific storage locations where application content is stored for different users of the computing device;
provide different lock screen interfaces for presentation on the computing device, the different lock screen interfaces being personalized for the different users of the computing device;
receive a swipe input in a particular direction while the computing device is in a locked state;
in response to the swipe input, scroll in the particular direction through the different lock screen interfaces to a selected lock screen interface for a selected user of the computing device;
receive another swipe input in another direction while the selected lock screen interface for the selected user is displayed on the computing device;
responsive to the another swipe input, activate a particular application while the computing device remains in the locked state;
based at least on the another swipe input being received while the selected lock screen interface for the selected user is displayed on the computing device, identify a selected user-specific storage location associated with the selected user for storing further application content provided by the particular application while the computing device remains in the locked state; and
when the particular application provides the further application content while the computing device remains in the locked state, store the further application content in the selected user-specific storage location associated with the selected user.

2. The computing device of claim 1, wherein the particular application is a camera application, the application content comprises images captured by the camera application prior to occurrence of the another swipe input, and the further application content comprises further images captured by the camera application after occurrence of the another swipe input.

3. The computing device of claim 2, wherein the selected user-specific storage location is a selected camera roll associated with the selected user and the plurality of different user-specific storage locations include other user-specific camera rolls provided by the operating system for other users.

4. The computing device of claim 1, wherein the operating system is further configured to:
in response to a further swipe input in the particular direction, scroll in the particular direction through the different lock screen interfaces to another selected lock screen interface for another selected user of the computing device;

in response to an additional swipe input in the another direction received while the another selected lock screen interface is displayed on the computing device, activate the particular application for the another selected user while the computing device remains in the locked state;

based at least on the additional swipe input being received while the another selected lock screen interface is displayed, identify another selected user-specific storage location associated with the another selected user for storing other application content provided by the particular application while the computing device remains in the locked state; and when the particular application provides the other application content while the computing device remains in the locked state, store the other application content provided by the particular application in another user-specific storage location associated with the another selected user.

5. The computing device of claim 4, wherein the particular application is a camera application and the application content, the further application content, and the other application content each include images captured by the camera application.

6. The computing device of claim 5, wherein the selected user-specific storage location is a camera roll associated with the selected user and the another user-specific storage location is another camera roll associated with the another selected user.

7. A method performed on a computing device, the method comprising:

providing a plurality of different user-specific storage locations where application content is stored for different users of the computing device;

providing different lock screen interfaces for presentation on the computing device, the different lock screen interfaces being personalized for different users of the computing device;

in response to a swipe input in a particular direction received while the computing device is in a locked state, scrolling in the particular direction through the different lock screen interfaces to a selected lock screen interface for a selected user of the computing device;

while the selected lock screen interface is displayed on the computing device, activating a particular application for the selected user while the computing device remains in the locked state;

based at least on the particular application having been activated while the selected lock screen interface is displayed on the computing device, identifying a selected user-specific storage location associated with the selected user for storing further application content provided by the particular application; and as the further application content is provided by the particular application, storing the further application content in the selected user-specific storage location associated with the selected user.

8. The method of claim 7, further comprising:
unlocking the computing device in response to further input from the selected user.

9. The method of claim 7, the swipe input comprising a touch input.

10. The method of claim 7, performed by an operating system of the computing device.

11. The method of claim 7, wherein the particular direction is a horizontal direction.

12. The method of claim 7, further comprising:
activating the particular application in response to another swipe input that is received while the selected lock screen interface is displayed on the computing device.

13. The method of claim 7, further comprising:
in an instance when the particular application is activated again, selecting another user-specific storage location for storing other application content provided by the particular application based at least on which of the different lock screen interfaces was displayed when the particular application was activated.

14. The method of claim 7, the particular direction being to the right from the perspective of the selected user.

15. The method of claim 14, further comprising:
receiving another swipe input that is in a vertically down direction; and
activating the particular application responsive to the another swipe input.

16. A computing device comprising:
a processor; and
a physical storage media storing instructions that, when executed by the processor, cause the processor to:
provide a plurality of different user-specific storage locations for different users of the computing device;
provide different lock screen interfaces for presentation on the computing device, the different lock screen interfaces being personalized for different users of the computing device;
allow the different users to activate a particular application from the different lock screen interfaces while the computing device remains in a locked state;
when the particular application provides application content for storage while the computing device is in the locked state:
identify an individual user-specific storage location in which to store the application content based at least on which of the different lock screen interfaces was used to activate the particular application; and
store application content provided by the particular application in the individual user-specific storage location.

17. The computing device of claim 16, further comprising a touch-sensitive display configured to display the different lock screen interfaces, wherein the instructions, when executed by the processor, cause the processor to:
scroll through the different lock screen interfaces in response to one or more swipe inputs on the touch-sensitive display; and
activate the particular application in response to one or more other swipe inputs on the touch-sensitive display.

18. The computing device of claim 16, the different user-specific storage locations comprising different folders.

19. The computing device of claim 17, the one or more swipe inputs being horizontal swipe inputs and the one or more other swipe inputs being vertical swipe inputs.

20. The computing device of claim 16, wherein the instructions, when executed by the processor, cause the processor to:
receive a further swipe input while a selected lock screen interface for a selected user is displayed by the computing device;
in response to the further swipe input, present a sign-on screen for the selected user; and
provided the selected user properly signs-on via the sign-on screen, unlock the computing device.

* * * * *